United States Patent [19]

Schneider et al.

[11] Patent Number: 4,824,578
[45] Date of Patent: Apr. 25, 1989

[54] METHOD OF PURIFYING BIOACTIVE SUBSTANCES BY BIOSPECIFIC ADSORPTION

[75] Inventors: Michel Schneider, Troinex, Switzerland; Christian Guillot, Saint-Julien en Genevois, France; Bernard Lamy, Carouge, Switzerland

[73] Assignee: Battelle Memorial Institute, Geneva, Switzerland

[21] Appl. No.: 23,861

[22] PCT Filed: Jun. 4, 1986

[86] PCT No.: PCT/CH86/00081

§ 371 Date: Feb. 5, 1987

§ 102(e) Date: Feb. 5, 1987

[87] PCT Pub. No.: WO86/07281

PCT Pub. Date: Dec. 18, 1986

[30] Foreign Application Priority Data

Jun. 10, 1985 [CH] Switzerland .................. 2436/85

[51] Int. Cl.⁴ .............................................. B01D 15/00
[52] U.S. Cl. .................................. 210/674; 210/679; 210/691

[58] Field of Search ............... 210/679, 691, 502.1, 210/506, 670, 674; 424/16, 23, 31; 502/401–405, 407, 415, 439

[56] References Cited

U.S. PATENT DOCUMENTS 3,652,761 3/1972 Weetall ................................. 424/12
4,190,425 2/1980 Bruening et al. ...................... 55/67

FOREIGN PATENT DOCUMENTS 2020527 7/1970 France .
2078427 11/1971 France .
2083067 12/1971 France .

*Primary Examiner*—Ivars Cintins
*Attorney, Agent, or Firm*—Cushman Darby & Cushman

[57] ABSTRACT

A ligand specific to a bioactive substance to be purified is fixed, through a connecting silane, to a mineral particulate carrier chosen from among $SiO_2$, $Al_2O_3$, $ZrO_2$ and $TiO_2$, the particles of the carrier being submicronic, non-porous and having a large specific surface. The carrier is contacted with an aqueous extract containing the bioactive substances, for the time required for the substance to become specifically fixed to the carrier. The carrier is then separated and the desired bioactive substance is isolated by desorption.

3 Claims, No Drawings

METHOD OF PURIFYING BIOACTIVE SUBSTANCES BY BIOSPECIFIC ADSORPTION

BACKGROUND OF THE INVENTION

1. Field of the Invention

The invention relates in general to purification of bioactive substances by biospecific adsorption. More specifically the invention relates to (a) a method of preparing a bioactive substance by adsorption on a mineral substrate in the aqueous phase, the substance being fixable to a given ligand by forming a specific stable reversible complex and the adsorbent carrier medium used being a finely divided mineral material modified by siloxane substituents carrying the ligands. The invention also relates (b) to a method of preparing the adsorbent substrate.

2. Description of the Prior Art

As is known, in order to purify biological substances (proteins, enzymes, heparin, hormones, lectins, antigens, antibodies and other polypeptides) by affinity chromatography, a chromatographic carrier material is selected and chemical molecules (ligands) having a strong specific affinity for the substance to be purified are grafted onto it. When the substance, to be purified is mixed with other substances from which it is to be separated, and placed in the presence of such a particular material, it becomes bonded to the ligand present on the material by a specific reaction (usually subsequently reversible), e.g. by forming complexes as in antigen-antibody reactions, whereas the other substances remain in solution. Subsequently the substance to be purified is salted out by placing the carrier material in a medium under conditions such that the complex dissociates and the desired substance and also the chromatographic carrier can be recovered and recycled in a new extraction process (see e.g. document U.S. Pat. No. 4,066,505). The salting out process is usually performed in a chromatographic column using an eluting solvent or solvent mixture.

The following are examples of carrier materials generally used for the aforementioned purposes: organic and mineral gels known commercially as Sephadex, Sepharose, Sephacryl, Spherosil, Ultogel, Affi-Gel, etc.

Usually these materials are made up of spherical or differently-shaped porous particles having sizes of the order of a few microns to a few hundred microns and pores measuring from 10 to 300 nm. The bonding agents for bonding a given ligand to the surface of the chromatographic carrier are molecules comprising a group capable of forming covalent bonds or other bonds with the ligand and also comprising a group for fixing the ligand (chemically or by adsorption) to the surface of the carrier. With regard to mineral carriers such as particles of silica (Spherosil) or porous glass (CPG glass), reactive silanes such as trialkoxy-alkyl silanes were the alkyl group comprises —OH, —CHO, —NH$_2$, —NCO or oxirane which react with the ligands to be fixed and used.

For example K. Roy et al, in "Affinity Chromatography and Biological Recognition", ed. I. M. Chaiken et al, Academic Press 1983, page 257, describe the use of a silica gel carrier silanized with γ-glycidyloxypropyl-trimethoxy-silane. P. O. Larsson et al in "some New Techniques Related to Affinity Chromatography", les Colloques de l'INSERM: Chromatographie d'affinite et interactions molecularies, ed. J. M. Egli (1979), page 91, describe silanization of silica gel (10 μm particles, 6 nm pores) by glyceropropyl trialkoxy silane (the alkyl substituent is a HOCH$_2$—CH$_2$OH—CH$_2$O—C$_3$H$_6$-group), the glycol group is converted to an aldehyde group by known methods and subsequently used to fix a bioactive ligand (e.g. an antibody) by a SCHIFF reaction with an amino group thereof followed by reduction of the N=C bond.

U.S. Pat. No. 3,652,761 describes the coupling of bioactive molecules (such as antigens or antibodies) to mineral carriers such as glass, silica gel, colloidal silica, bentonite, wollastonite, etc, by of alkylated alkoxysilanes where the alkyl group comprises amino, nitroso, carbonyl, carboxy, isocyanato, diazo, isothiocyanato, sulphydryl and halogenocarbonyl.

Document WO-A-82/02818 describes a method and device for separating immunoglobulins from milk by conveying the milk over a column filled with a bed of particles, such as a, porous glass silanized by the previously-mentioned conventional method and carrying monoclonal antibodies specific to one or the other of the immunoglobulins to be purified.

Other documents such as EP-A 56977 and EP-A 88818 discuss similar subjects.

The methods known hitherto and using the aforementioned techniques also have some disadvantages associated with the porous nature of the carriers used, the pore dimensions and the fact that the particles in the carriers must be substantially spherical in shape and have uniform dimensions to avoid channelling when placed in columns. Since most of the active surface of these particles is inside the pores and the pores often have dimensions of the same order of size as the molecules to be fixed, the molecules diffuse slowly inside the pores and, when salted out, have difficulty in diffusing towards the exterior of the particle. Also the substances (frequently macromolecules) to be purified only have low intrinsic diffusion speeds. Since the average distance to be travelled by the macro-molecules to reach the ligand in question is relatively large (a few tens of microns in the case of adsorbing particles) it is clear that the processes are slow and inefficient, whether for adsorption or desorption of substances to be purified. Small pores are not accessible to large molecules and ligands present in these pores will therefore be incapable of fixing the substance to be purified.

For the reasons given hereinbefore, the use of porous biospecific adsorbents have numerous disadvantages, mainly their low fixation capacity and the slowness of the adsorption and desorption steps. With regard to the fixation capacity, it is stated in document U.S. Pat. No. 3,652,761 that if the grafting rate is 14 to 18 mg of antigen (ligand) per gram of porous glass, only about 5 mg of antibody (human gamma-globulin) is fixed per g of carrier. Furthermore, the cost of porous beads of uniform dimension is very high and incompatible with large-scale industrial use.

DETAILED DESCRIPTION OF THE INVENTION

The method according to the invention obviates the aforementioned disadvantages and can substantially increase the specific extraction yield. Furthermore, the rate at which the products to be extracted are fixed on the substrate is high and therefore the method is more economic to use. Finally the method can be used without difficulty for treating relatively large quantities (several tens to several hundred tons per year) of substances to be extracted, in contrast to earlier techniques. Furthermore the cost of non-porous submicronized silica is about a thousand times lower than the cost of carriers having standardized pores generally used for purification by adsorption. Contrary to expectation, the non-porous submicronic particles used according to the invention are easily separated by filtration after being grafted by a ligand.

The following are examples of mineral carriers which are preferably used according to the invention: precipitated or pyrogenic silica having primary (non-agglomerated) particles between 0.01 to 0.1 $\mu$m in size depending on categories and having a large specific surface. $Al_2O_3$, $TiO_2$ and $ZrO_2$ are used in powder form having particles generally between 0.02 and 1 $\mu$m. Hereinafter reference will be made more particularly to silica, though it is understood that the information given applies equally well to alumina, $TiO_2$ and $ZrO_2$. Use may also be made of the silicate carriers described in U.S. Pat. No. 3,652,761. With regard to the aforementioned carriers, the following documents should be noted:

U.S. Pat. No. 4,190,425 describes polymer materials based on submicronic silica for filling columns for gas phase chromatography. Examples 4-12 disclose a method of grafting organic radicals on to silica particles and subsequent copolymerization thereof with monomers so as to obtain a highly porous medium (see Abstract, line 16). This material, therefore, would be unsuitable for the requirements as in the present invention. Also, this document teaches silylation for the purpose of de-activating the chromatographic carrier (using hexamethyldisilazane), but does not teach silanation of silica particles for the purpose of grafting as per in the invention.

Document FA-A 2 020 527 describes immobilization of bioactive molecules (e.g. enzymes) on mineral carriers using silanes as coupling agents. Porous glass, silica gel, bentonite, alumina, hydroxyapatite and colloidal silica are given as examples of mineral carriers. However, the object of document FR-A 2 020 527, i.e. the preparation bioactive mineral carriers which can be recycled, differs from that of the present invention. Immobilized enzymes are catalysts and not biospecific adsorbents, which act in a completely different manner. Also, the silanes described in the reference are grafted in an anhydrous medium (xylene, benzene) instead of an aqueous medium as in the invention.

Document FR-A 2 083 067 also relates to enzymes which have been made insoluble, such as silica-containing substances carrying a re-usable enzyme fixed on a polymer and an organosilane (see page 4, lines 9-17). With respect to the intermediate polymer, the teaching in this document is still remote from that of the invention.

Document FR-A 2 078 427 deals with a similar subject. Example 1 in this document describes the fixation of trypsin on to silica type Cab-O-Sil (this is the name used for sub-micronic silica) through a silane and a carbodiimide. This teaching is therefore very similar to that of document FR-A 2 020 527. In order to obtain a reusable catalyst of this kind, trypsin must be strongly bonded to the mineral carrier, which is completely different from the invention. The object of the invention is to obtain a reversible bond such as that resulting from selected adsorption of trypsin by a ligand such as phenylbutylamine (which is fixed to the non-porous mineral particles), the adsorption being reversible so that the trypsin can be subsequently salted out.

In order to carry out step (a) of the present process in the case of silica, an aqueous suspension of the "silica-ligand" carrier is added to an aqueous medium containing the bioactive substance to be isolated, the reactants being contacted under optimum conditions where it is easy to adjust the pH, the ionic strength and the temperature, thus greatly improving the yield on extraction. The adsorption and fixation yields for the desired substance are excellent. The reaction is also very rapid, since the carrier has no pores into which the molecules (usually bulky molecules) have to penetrate before being purified, as in the case of conventional carriers. Also the reactive groupings are available on the outer surface of the particles. Consequently the time for practically complete fixation is normally about 5 to 10 minutes at ambient temperature. It is also possible to work at ambient pressure, which is more economical than in the case of porous supports which need a relatively high pressure, depending on circumstances.

Generally, when using suspensions of submicronic silica according to the invention, the density of the hydrated adsorbent suspension is about 0.2 (5 ml of adsorbent suspension per g of $SiO_2$) and the suspension has a biospecific adsorption capacity of about 100 to 300 mg of bioactive substance per g of silica. These values correspond to an adsorption capacity per g of silica which is at least one order of magnitude greater than for conventional porous carriers.

Step (b) of the present process can be carried out by filtration by conventional means or by centrifuging. Centrifugal gravitation fields of the order of 4 000 to 6 000 g are suitable and can be obtained without difficulty in high-capacity centrifuges, i.e. capable of treating one or more liters of suspension per operation.

Separation can also be brought about by the method known as tangential filtration using an ultra-filtration or microfiltration diaphragm of given porosity. In this method, the suspension to be filtered is contacted with the diaphragm surface and conveyed at high speed at a tangent thereto. The permeability of the diaphragm is chosen so that a considerable flow of liquid phase travels into the permeate whereas the actual particles cannot travel through the diaphragm and are therefore progressively separated from the liquid phase containing the non-adsorbed substances. Some commercial tangential filtration devices use hollow filters in which the suspension flows (e.g. Module Microdyn by ENKA GmbH, Wuppertal, FRG; Module CARBOSEP by SFEC, Bollene, France). Other devices use flat diaphragms (Pellikon Cassettes by MILLIPORE). Alternatively the charged particles can be separated from the dissolved substances to be eliminated by the diafiltration method in which a quantity of aqueous phase equal to that eliminated in the permeate is continuously added to the suspension being filtered, and the process is continued until the aqueous phase contains only the particulate substrate carrying the extracted substance and is free from other dissolved products which are originally present in the solution to be purified.

In these operations it is not necessary to dry the charged silica after washing or to isolate it from the washing medium, since the medium is usually suitable for the subsequent operations, i.e. step (c).

Desorption in step (c) of the substance to be purified from the carrier, i.e. dissociation of the ligand complexed with the substance to be purified, is brought about by conventional methods, i.e. by suitably adjusting the characteristics of the aqueous phase (pH, temperature, ionic strength, dilution by a suitable organic solvent, etc.). Operating conditions for desorption are described in the following reference: E. A. Hill and M. D. Hirtenstein, Adv. in Biotechn. Process 1, 31 (1983). Some of the most commonly used methods relate to modifying the ionic strength or the pH, and use of chaotropic agents (e.g. KSCN), water-soluble organic solvents (alcohols, ethylene glycol, isopropanol, etc.), "deforming" agents (urea and guanidine) and ligands in the free state. In some cases dissociation is advantageously brought about by using an aqueous 0.5M NaCl phase containing about 20% isopropanol or another comparable water-soluble solvent.

Step (d) can be brought about by methods similar to those described hereinbefore for step (b). The silica-ligand substrate from which the substance to be purified has been detached can be separated by using the previously-mentioned techniques of centrifuging and filtration, including tangential filtration. In that case, of course, the filtrate will be the phase mainly required, since it contains in solution the substance which is to be purified. The substance is extracted by conventional methods, i.e. the water is evaporated by distillation, e.g. at ordinary pressure or under reduced pressure in the rotavapor, or by lyophilization or spraying, until separation or precipitation occur. Alternatively, precipitation can be brought about by adding a non-solvent or by salification (e.g. by adding $(NH_4)_2SO_4$). The substance is then collected and stored by conventional methods. The resulting silica-ligand system is normally reusable as such in a new extraction operation.

The silica carrier (silica-ligand system) used in the method according to the invention can be prepared either by silanization of submicronic silica using an alkoxy silane on to which a suitable ligand has previously been deposited, or by silanization of the silica by an alkoxy silane carrying a group capable of fixing the ligand, which is subsequently supplied.

In the first case, submicronic silica, e.g. pyrogenic or precipiated silica having a specific surface of the order of 50 to 600 $m^2/g$ (AEROSIL types -130, -200, -300 and -380 by DEGUSSA are suitable, as are CAB-O-SIL varieties by CABOT Corp., USA) is dispersed by violet agitation in a liquid, e.g. an organic solvent or water, preferably in the presence of glass balls, until a milky homogeneous liquid is obtained. The glass balls in the agitated mixture reduce the size of the agglomerates of $SiO_2$ particles which tend to form under these conditions (by adhering together due to their high hygroscopicity). Alternatively dispersion can be brought about by use of a homogenizer, e.g. the POLYTRON device by KINEMATICA GmbH, FRG. In the case of alumina, "Aluminiun oxide-C" by DEGUSSA or ALCAN by CABOT may be used. $ZrO_2$ and $TiO_2$ are used in the form of very fine powder having a specific surface of at least 50 $m^2/g$ (e.g. Titanium dioxide P 25 by DEGUSSA). After a certain dispersion time (half to one hour) at ambient temperature in a suitable device, the size of the agglomerates becomes standardized at about 100 to 1 000 nm, preferably 200-300 nm (note that the primary individual particles of silica initially measure only a few nanometers). The size of the agglomerates after dispersion can be checked by conventional methods, e.g. using a COULTER Nanosizer.

A suitable silane is selected and reacted with the ligand required for subsequent formation of the specific complex with the substance to be purified. Examples of such ligands are antibodies of the substances to be purified, enzyme inhibitors, co-factors, lectins, dyes such as Cobachron blue F3G-A or PROCION (ICI), hydrophobic groupings such as alkyl or phenyl radicals, carbohydrates, heparin, etc.

The silanes used in the method are selected from compounds having a reactive group forming part of the alkyl substituent bonded to the silicon atom and suitable for fixing the chosen ligand. We have already seen the various kinds of trialkoxy silanes which may be suitable, depending on the individual case, and are selected according to the structure of the ligands to be added and the nature of the reactive groups thereof. Polypeptide ligands are usually fixed through their reactive groups —OH, —$NH_2$, SH or —COOH (modified with intermediate reagents if required) and suitable silanes contain fixing groups such as —NCO, azo, glycidoxy, —CHO, oxirane, amino-, etc. In some cases a bridging agent must be used between the reactive silane group and the ligand to be fixed, e.g. in the case of the bond between an $NH_2$ grouping and a carboxylic acid (use of a carbodiimide) or in the case of coupling two amino functions where the bridging agent can be a dialdehyde, e.g. glutaraldehyde. According to the invention it is preferred to use trimethoxyaminopropylsilane and trimethoxyglycidoxypropylsilane. Of course, other alkoxy silanes such as the corresponding ethoxy, propoxy or butoxy silanes are also suitable. The reaction between the silane and the ligand is brought about by conventional methods and under the normal conditions for the intended reaction. These conditions are known to the one skilled in the art and need not be detailed here. However, it is a non-aqueous medium such as THF, acetone, dioxane or other anhydrous (but water-soluble) organic solvents in which siloxane groupings are stable. In some cases it is possible to operate without a solvent.

When the ligand has been fixed to the silane derivative, the reaction mixture is added at ambient temperature and with agitation to the aqueous or organic silica suspension described hereinafter. It is also possible to heat the reaction mixture at a higher temperature, e.g. by heating to between 20° and 80° C. for a number of hours (usually from 1 to 8 h). After cooling, the desired suspension of "silica-ligand" substrate is obtained and can be used as such in the method according to the invention (see claim 1).

In the second case of preparing the silica-ligand system, trialkoxysilane is first contacted with the silica suspension, preferably an aqueous solution, and the ligand is not added until later. This method is preferable when the ligand is insoluble in or reacts with organic solvents or sensitive to the presence thereof (denaturation), as in the case of bacitracin or an antibody or a lectin. In that case the silanization reagent can either be added directly to the aqueous silica suspension or the silane reagent can first be dispersed in water at pH 4–10 in order to bring about hydrolysis of the alkoxy groups thereof after which the suspension of pre-hydrolyzed alkoxy silane is added to the silica suspension. Note that the time during which the trialkoxy silane is kept in an aqueous medium before adding to the mineral carrier has an influence on the properties of the silanized silica with regard to subsequent fixation of the chosen ligand. It is therefore possible, by adjusting the experimental conditions (the period before adding the carrier to be grafted, the pH during grafting and the temperature) to adapt the properties of the silanized carrier to the nature of the ligands to be used, and this is an additional advantage of the present method, since the pH of the aqueous medium where silanization occurs and the temperature are also very important. The higher the pH (within the range under consideration) the more the aqueous solution tends to thicken and the volume of the carrier (when separated from the liquid by centrifuging) tends to increase. Temperatures on the order of 100° C. are suitable for aminosilanes whereas in the case of the glycidoxy- compound it is preferable not to exceed 50° C.

The ligand is fixed to the silanized carrier in aqueous solution under conventional conditions, usually by adding the ligand (in aqueous solution) to the silanized silica suspension obtained as described hereinbefore and by leaving the reagents together for sufficient time for the ligand to become bonded to the carrier. In some cases (see hereinbefore) bridging reagents are used at this stage (see Example 5). The resulting "silica-ligand" system is then used in the extraction process as described hereinbefore. In some cases, however, the ligand can be fixed to the silanized carrier in a non-aqueous organic medium. In that case a water-soluble organic solvent is added to the dispersed silanized carrier. The mixture is centrifuged, the residue is dissolved in the solvent and the operation is repeated until the residual water is eliminated, thus yielding a final suspension of silanized particles in the organic solvent. THF, dioxane and ethanol are examples of solvents.

The ligand is fixed directly to the silane as in the previously-mentioned case.

The following examples illustrate the invention.

EXAMPLE 1

23 ml (0.1 mol) of glycidoxypropyl trimethoxysilane in 77 ml of a 10 mM solution of sodium acetate at pH 4 were added dropwise at ambient temperature with agitation. After addition, the mixture was left at ambient temperature with agitation for 30 minutes.

6 g of pyrogenic silica (Aerosil 130, DEGUSSA) was dispersed in 60 ml water by agitation in the presence of glass balls (diameter 3 mm) until a milky suspension was obtained, the average particle size being 200–300 nm.

6 ml of the silane solution was then added with agitation to the silica suspension (1 mmol silane/g silica) and the pH was increased to 8.5 with a 0.5M solution of $K_2HPO_4$ (approx. 1 ml) and a few drops of a 1N solution of NaOH. After standing overnight, the suspension was centrifuged (10 min at 6 000 g) and the residue was redissolved and rinsed twice in 100 ml of pure water.

The silanized silica was re-suspended in 50 ml water and a solution of 25 g bacitracin in about 100 ml of 0.2M bicarbonate buffer at pH 8.0 was added with agitation to a quantity of suspension corresponding to 5 g of the initial silica. The mixture was then left to stand at ambient temperature, pH 8, for 24 hours.

The mixture was then centrifuged to separate the mineral carrier from the excess bacitracin solution and the residue was re-suspended in an excess of a 1M solution of ethanolamine at pH 8 (50 ml) in order to deactivate any epoxy groups still present. The suspension was centrifuged (10 min, 6 000 g) and the residue was then washed 4 times (each time with intermediate separation by centrifuging), i.e. twice in succession with water, once in 1M NaCl and finally in Tris buffer (10 mM) and 0.2 mM of $CaCl_2$, pH 8.

The "silica-bacitracin" carrier was then used for extraction and purification by biospecific adsorption of the enzyme subtilisin BPN', which forms a specific complex with bacitracin.

The aforementioned carrier was introduced, in the proportion of 100 mg solid substrate per ml of solution, into a previously-clarified fermentation medium at pH 8 containing 47 mg/ml proteins having an enzymatic activity of 2 000 U/ml. Hereinbefore, the unit of subtilisin BPN' is defined as the quantity of enzyme capable of hydrolyzing 1 μmol of the ethyl ester of N-acetyl-L-tyrosine per minute at ambient temperature at pH 8. After incubation for 30 min the mixture was centrifuged (6 000 g, 10 min) and the supernatant liquid was analyzed, showing that its enzymatic activity corresponding to 3.7% of the initial activity and it contain 74% of the initially-present proteins in solution.

The residue was suspended in a 1M solution of NaCl containing 25% by volume of isopropanol, using 30 ml of the solution per g of carrier. After 1 hour a liquid fraction E1 was obtained by further centrifuging. The residue was dissolved and re-extracted in identical manner, yielding a second fraction E2. Fractions E1 and E2 were combined and analyzed, showing the presence of 96.4% of the original enzymatic activity combined with 23% by weight of the quantity of proteins present in the starting solution. The subtilisin purification factor was therefore 4.2.

EXAMPLE 2

Silanized silica was used as in Example 1 and coupled with concanavalin A lectin (Con A), operating in a 0.2M, pH 9 carbonate buffer. The solution of Con A dissolved in the same buffer (21 mg/ml) was added at the rate of 247 mg of Con A per g of silanized silica (calculated as dry product) and was left under agitation at ambient temperature overnight. The free epoxy groups were then blocked by ethanolamine in 1M solution, pH 9, and left to stand overnight.

The solid was then separated by centrifuging and the residue was washed (by re-suspension in an aqueous medium followed) by centrifuging) using the following solutions:

Water twice; 1M NaCl in Tris 10 mM buffer, pH 9; 1M NaCl in 10 mM acetate buffer, pH 5; finally 0.05M NaCl in Tris 0.05M at pH 8. The solution still contained 2 mmols per liter of each of the following ions: $Ca^{++}$, $Mg^{++}$, $Mn^{++}$.

The silica- Con A substrate was then used to extract immunoglobulin IgG conjugated with horseradish peroxidase. A preliminary check was made of absence of affinity of the silica- Con A system for IgG alone. 10 mg of human IgG (Miles) dissolved in a Tris 50 mM, NaCl 50 mM buffer at pH 8, were treated with 100 mg of silica- Con A. After contact for 30 minutes, the mixture was centrifuged as previously described (6 000 g; 10 min), the residue was re-dispersed in the same medium and re-centrifuged. The supernatant liquids from the two operations were combined and analyzed, showing the presence of 98% of the initial protein content. The human IgG in solution was then tagged with peroxydase as per S. AVRAMEAS, Immunochemistry (1969) 6, 43. The tagged IgG fraction was then extracted, using the silica-Con A carrier.

The solution simultaneously containing free IgG and IgG tagged with peroxidase was then treated with 100 mg of silica-Con A carrier per 6 mg of proteins in solution. The medium consisted of the following buffer: 50 mM NaCl, 50 mM Tris, pH 8, $Ca^{++}$, $Mg^{++}$, $Mn^{++}$ 2 mM. After 30 minutes at ambient temperature, the particles of solid were separated by centrifuging. An analysis showed that the supernatant liquid contained only 8.2% of the initial peroxidase activity but about 92% of the non-conjugated portion of IgG.

The peroxydase IgG complex fixed to the silica-Con A carrier was dissociated as follows. The charged carrier was suspended in a 0.1M solution of χ-methylglucoside in the following buffer solution: 50 mM NaCl, 50 mM Tris; pH 8; $Ca^{++}$, $Mg^{++}$, $Mn^{++}$ 2 mM. Incubation for 30 minutes was followed by centrifuging (6 000 g, 10 min). The supernatant liquid contained 86.2% of the original peroxidase activity.

EXAMPLE 3

6 mmols of 4-phenylbutylamine (ligand) was added dropwise at 4° C. to 5 mmol of glycidoxypropyl trimethoxysilane. The mixture was agitated for a further hour at 4° C. after which the temperature was allowed to rise and agitation was stopped after a total of 5 hours.

Next, 10 ml of an aqueous solution of $CH_3COONa$ (10 mM, pH 4) was added to the solution and prehydrolysis of the alkoxy groups was allowed to occur at ambient temperature for about 30 minutes.

Meanwhile an aqueous dispersion of pyrogenic silica (AEROSIL-130) was prepared as described in Example 1 and the aqueous solution of silane obtained as described hereinbefore was added to the dispersion at the rate of 50 μmols of silane per g of silica. The pH was adjusted to 8.5 and the grafting reaction was allowed to occur at ambient temperature for 72 hours.

The silanized silica carrier was isolated and coupled to the ligand by the methods described in Example 1 and resuspended in a 50 mM $CaCl_2$, 50 mM Tris (pH 8) buffer in the proportion of 40 mg of solid per ml of aqueous phase. The suspension was then added to a crude pancreatic extract in the same buffer as before (pH 8). In addition to contaminants of pancreatic origin, the extract contained trypsin and chymotrypsin. The proportion of carrier added to the solution of extract was 10 g per g of dry extract material. After contact for 30 minutes, the solid was separated as described in the preceding examples and the supernatant liquid (S1) was placed on one side. The operation was repeated after suspending the residue in the same buffer in the proportion of 25 ml/g silica, thus obtaining a second portion of liquid (S2). Finally the solid was re-suspended a third time but in a 1M solution of tetraethylammonium bromide (25 ml/g of solid) and centrifuged, obtaining a third portion of liquid (E1).

The various harvested fractions were then analyzed for enzymes. The analyses were based on the use of N-benzoylarginine-p-nitroanilide (BAPNA) as substrate for trypsin and glutaryl-phenylalanine-p-nitroanilide (GLUPHEPA) as substrate for chymotrypsin. The techniques were as follows:

Trypsin: 10 μl of the solution for analysis was added to an excess of a $10^{-3}$M solution of BAPNA in a 10 mM $CaCl_2$ and 50 mM Tris-HCl buffer, pH 8, and the quantity of p-nitroaniline formed at 410 nm was measured by spectrophotometry. A BAPNA unit was defined as the quantity of trypsin capable of hydrolyzing 1 μmol of BAPNA per minute at ambient temperature under the aforementioned conditions. By way of example, a sample of very pure trypsin (origin SIGMA, type 1X) having a given BAEE activity of 15600 units/mg has a strength of 2.35 BAPNA units/mg.

Chymotrypsin: 10–20 μl of the solution for analysis was added to an excess of a $10^{-3}$M solution of GLU-PHEPA in a 10 mM $CaCl_2$, 50 mM Tris-HCl buffer, pH 7.6, and the rate of liberation of p-nitroanaline by hydrolysis at 410 nm was measured. A GLUPHEPA unit was defined as the amount of trypsin capable of liberating 1 μmol of p-nitroaniline/min at ambient temperature under the given conditions. For example a highly purified preparation of chymotrypsin (SIGMA type II) given as having an activity of 65 BTEE units/mg has a strength of $68 \times 10^{-3}$ GLUPHEPA units (mg).

These methods were used for analyzing the various fractions in the present example, giving the following results:

| Sample | BAPNA activity | | GLUPHEPA activity | |
|---|---|---|---|---|
| | units | % | units | % |
| Starting sample: | 5,450 | 100 | 816 | 100 |
| S1 | 3,690 | 77 | 62 | 8.5 |
| S2 | 490 | | 7 | |
| E1 | 420 | 7.7 | 626 | 77 |

As these results clearly show, the present system of silica-4-phenyl-butylamine selectively fixes chymotrypsin in the presence of trypsin. The fixed chymotrypsin is also salted out by the tetraethyl ammonium solution and contains less than 10% of the starting trypsin. The purification yield for chymotrypsin was 77%.

EXAMPLE 4

In this Example, aluminium oxide (type C, DEGUSSA) was used as the mineral carrier. The alumina (5 g) was dispersed in 50 ml water, using a Polytron homogenizer. The average size of the particles after dispersion, as measured with the Coulter Nanosizer, was 220 nm. Also, an aqueous solution of glycidoxypropyl trimethoxysilane (1 mmol/ml) was prepared as described in Example 1.

An aliquot part of the aqueous silane solution was then added with agitation to the alumina suspension (1 mmol) of silane per g of alumina) and the pH was adjusted to 7.5 by adding a few drops of aqueous 1N NaOH solution. After standing overnight, the suspension was centrifuged (6 000 g, 10 mn) and the residue was dissolved in pure water and re-centrifuged under the same conditions. The silanized alumina was then coupled with m-aminophenyl boronic acid (0.5M) in 0.2M bicarbonate buffer at pH 9.0 and the mixture was left to stand at pH 8.0 and ambient temperature for 72 hours. The particles of the alumina and m aminophenyl boronic acid system were then washed four times by centrifuging and resuspended in water. After the last centrifuging operation, the carrier was suspended in a 10 mM Tris, 0.2 mM $CaCl_2$ buffer at pH 8.0.

The carrier was then used to extract and purify subtilisin BPN'. The same clarified fermentation medium was used as in Example 1, containing 47 mg/ml of proteins and having an enzymatic activity of 2 000 U/ml, and 100 mg of carrier were added per ml of solution. After 20 minutes at ambient temperature, the mixture was centrifuged (6 000 g, 10 min). The supernatant liquid was analyzed, showing that the enzymatic activity of the liquid corresponded to 32% of the initial enzymatic activity. The residue was suspended in a 0.5M solution of pentaerythritol and was re-centrifuged after an hour, yielding a liquid fraction E. The fraction contained 59% of the enzymatic activity initially present and 24% of the quantity of proteins present in the starting solution.

By means of this operation, therefore, the initial subtilisin was purified with a purification factor of 2.25.

EXAMPLE 5

10 mmols of gamma-aminopropyl-trimethoxysilane was added dropwise to 5 ml of a solution of 0.02M sodium acetate, pH 4.0, care being taken to keep the pH between 4 to 5 by progressively adding 4N hydrochloric acid. The solution was then kept for 30 minutes under agitation at ambient temperature. Its volume was then made up to 10 ml with distilled water.

Pyrogenic silica (Aerosil 300, 5 g) was dispersed in 50 ml water, using a POLYTRON homogenizer. The aqueous solution of silane was then added to the dispersed silica suspension in the proportion of 1 mmol silane per g of silica and the pH of the solution was adjusted to 7.4 by adding 1M $K_2HPO_4$. The suspension was left under agitation overnight at ambient temperature.

The particles were then centrifuged (10 min, 6 000 g) and the residue was suspended in distilled water. This operation was repeated four times, the particles being successively suspended in 1M NaCl, distilled water, a 50:50 water/alcohol mixture, and finally in pure ethanol. The final suspension in ethanol contained about 50 mg silica per ml. Next, a 0.5M solution of N-carbobenzoxy-L-phenylalanine (Z-L-Phe) was prepared in ethanol and a 0.5M solution of N-ethoxycarbonyl-2-ethoxy-1,2-dihydroquinoline (EEDQ). 10 ml of the solution of Z-L-Phe was added to 100 ml of the silanized silica suspension, followed by 10 ml of the solution of EEDQ; the mixture was left under agitation at ambient temperature for 24 hours.

The particles were then washed by repeated centrifuging followed by re-suspensions in the initial ethanol (three times) then in the ethanol/water mixture (once) and finally in distilled water.

The particles were used to purify a solution containing subtilisin BPN' as described in Example 1. 100 mg of silica-Z-L-Phe per 200 U of enzyme were used. Under these conditions, the supernatant liquid after centrifuging (S1) contained less than 1% of the initial enzymatic activity. The particles were then suspended in a 1M NaCl solution containing 25% isopropanol and the suspension was centrifuged one hour later. This time the supernatant E1 contained 87% of the original enzymatic activity.

We claim:

1. A method of separating a bioactive substance by adsorption on a mineral carrier in the aqueous phase, the substance being capable of being specifically and reversibly fixed to a given ligand, the adsorbent substrate used being a mineral-ligand system comprising a particulate material wherein such material is $SiO_2$, $Al_2O_3$, $TiO_2$ or $ZrO_2$ to which the ligands are fixed through siloxane agents, the method comprising the steps of:

(a) mixing the carrier with the aqueous phase so that the substance in the aqueous phase becomes bonded to the ligand thereby forming a charged carrier;

(b) centrifuging or filtering the aqueous phase of step a in order to separate the charged carrier from the aqueous phase;

(c) dispersing the charged carrier separated in step b in a second aqueous phase, thereby desorbing the substance from the carrier, and (d) centrifuging or filtering the second aqueous phase in which the charged carrier was dispersed, thereby separating the carrier from the second aqueous phase containing the desorbed substance, and (e) isolating the desorbed substance from the second aqueous phase, wherein the mineral particles used as the adsorbent substrate are submicronic and non-porous.

2. A method according to claim 1, wherein a finely powdered material having a particle size less than 1 um and a specific surface of 50 to 600 $m^2/g$ comprises the mineral carrier.

3. A method according to claim 2, wherein the material is precipitated or pyrogenic silica.

* * * * *